United States Patent Office 3,354,196
Patented Nov. 21, 1967

3,354,196
CHRYSANTHEMIC ACID INTERMEDIATES
Marc Julia, Paris, France, assignor to Rhone-Poulenc S.A., Paris, France, a French body corporate
No Drawing. Filed Dec. 9, 1963, Ser. No. 329,262
Claims priority, application France, Dec. 13, 1962, 918,530
10 Claims. (Cl. 260—465)

The present invention relates to the production of chrysanthemic acid and its lower homologue (dl)-trans-2,2-dimethyl-3-(1-propenyl)cyclopropane carboxylic acid. The Geneva system of numbering is used throughout this specification.

It is known that some esters of chrysanthemic acid, such as the pyrethrins, the cinerins, the allethrins and the furethrins, constitute a class of very interesting insecticides, because of their great insecticidal activity coupled with their low toxicity to man and warm blooded animals. It is known that chrysanthemic acid exists in two stereoisomeric forms, cis and trans, of which the esters of the trans form have generally the higher activity.

Hitherto, chrysanthemic acid has been prepared by hydrolysis of rethrins of natural origin or by the synthesis of Staudinger et al. [Helvetica Chimica Acta (1924) 7, p. 390], further developed by Campbell et al. [J. Chem. Soc. (1945), p. 283]. This synthesis, which starts with the reaction of ethyl diazoacetate with 2,5-dimethyl-hexa-2,4-diene and leads to a mixture of the (dl)-cis- and (dl)-trans-chrysanthemic acids, is, however, fairly delicate to operate because of the instability of ethyl diazoacetate. The resulting danger renders its industrial application very complicated. A similar synthesis, in which ethyl diazoacetate is replaced by diazoacetonitrile, gives pure (dl)-trans-chrysanthemic acid, but involves even greater risks.

In United States specification No. 3,077,496 there has been described a process for the preparation of (dl)-trans-chrysanthemic acid in which 4-methyl-3-isobutenyl-γ-valerolactone is converted into alkyl 5-methyl-3-(1-halogenoisopropyl)-hex-4-enoate, followed by cyclisation of this ester into a crysanthemic ester, and saponification.

The present invention provides a new process for the preparation of (dl)-trans-chrysanthemic acid and its lower isomer, 2,2-dimethyl-3-(1-propenyl)cyclopropane carboxylic acid, also as the (dl)-trans- isomer, and new intermediates useful in this process.

One important group of the new intermediates consists of the compounds of the formula:

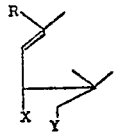

in which R is hydrogen or methyl, X represents a reactive ester residue, such as a halogen atom, preferably chlorine or bromine, or a sulphonic ester residue such as a p-toluenesulphonyloxy or methanesulphonyloxy group, or an aliphatic or aromatic carboxylic ester residue, for example acetoxy, benzoyloxy, or p-nitrobenzoyloxy; and Y represents —CN or —COOR', where R' represents a lower alkyl radical, preferably methyl, ethyl, or propyl. Preferred compounds are those in which either X is acyloxy and Y is —CN, or X is halogen and Y is —COOR'.

These compounds may be cyclised to give compounds of the formula:

(wherein R and Y are as hereinbefore defined) by treatment in an inert anhydrous solvent with a strong alkali metal base, preferably an alkali metal hydride, amide, or alkoxide, more especially sodium or potassium t-butoxide or t-amoxide. Other alkaline agents, such as triphenylmethyl sodium, may also be used.

The operation is carried out in an organic solvent which is inert under the operating conditions, for example an aromatic hydrocarbon (e.g. benzene or toluene) or the tertiary amide of a lower saturated fatty acid, preferably dimethylformamide or dimethylacetamide, at ambient temperature or, more often, at boiling point. The product of the reaction, which is the product of Formula II, may then be converted into chrysanthemic acid or its lower homologue (dl) - trans-2,2-dimethyl-3-(1-propenyl)cyclopropane carboxylic acid, as such or as an alkali metal salt, by saponification, preferably by treatment with alkali metal hydroxide in an alcoholic medium (for example methanol, ethanol or ethylene glycol). The alkali metal salt is first obtained, and may be either isolated as such or converted into the corresponding acid by acidification with a strong mineral acid.

The present invention also provides, as novel intermediates of use in the synthesis of chrysanthemic acid and its lower homologue disclosed herein, the compounds of the formulae:

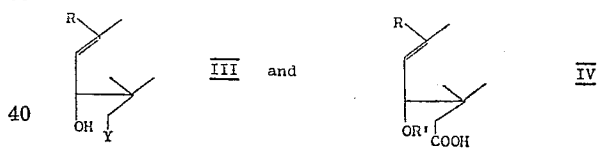

in which Y, R and R' are as hereinbefore defined.

The conversion of the compounds of Formulae III and IV into the compounds of Formula I may be carried out by the application of any appropriate method.

Thus, the compounds III may be reacted with a reagent known to be capable of converting a hydroxyl group into a reactive ester residue. In this process, however, it is necessary to ensure that a compound of the formula:

is not simultaneously produced by dehydration. The reagent used is preferably an acyl halide or anhydride, preferably of a carboxylic acid, for example acetyl chloride, acetic anhydride, benzoyl chloride, or p-nitrobenzoyl chloride. Generally, the process is operated at ambient temperature (about 20° C.) or at a temperature slightly above this.

The compounds of Formula IV are best converted into compounds of Formula I by the reaction for converting halides of γ-alkoxycarboxylic acids into halogeno esters described by F. F. Blicke et al. [J. Amer. Chem. Soc. (1941), p. 2488], and Prelog [Berichte (1941), p. 1702]. The compound of Formula IV is heated with a reagent known to be capable of converting a carboxylic acid into a carboxylic acid halide and the reaction mixture is heated. It is possible to separate an acid halide of the compound of Formula IV into the cold and to rearrange it to the halogeno ester by heating, but it is simpler to carry out the halogenation of the compound of Formula IV at elevated temperature. The reaction may be presented by the following diagram, in which Hal represents halogen, preferably chlorine or bromine, and R' is as hereinbefore defined.

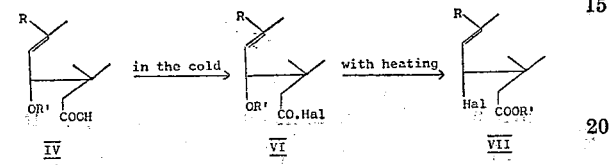

For this transformation it is preferred to employ thionyl chloride, a phosphorus halide, phosgene, or a sulphonic acid chloride. When a halide capable of giving rise to the formation of a hydrohalic acid is employed, this acid may be simultaneously attached to the double bond, in a proportion varying in accordance with the reaction conditions. There is then obtained a mixture of compound VII having an ethylenic bond with a saturated compound of the formula:

The presence of a compound of Formula VIII is not troublesome because the double bond may be restored to the desired position without separation of the compound from that of Formula VII. It is therefore possible to proceed directly with the cyclisation of a mixture of compounds of Formulae VII and VIII by treatment with a strong anhydrous base. With reagents such as sodium hydride or amide the compound of Formula IX:

is then directly obtained, and can be saponified to the corresponding carboxylic acid.

With other cyclisation reagents, such as sodium t-butoxide and sodium t-amoxide, there is obtained a mixture of the compound of Formula IX and of its isomer of the formula:

The ester of Formula X and the corresponding carboxylic acid can be isomerized, into the ester of Formula IX or the corresponding acid respectively, by heating, preferably in the presence of a trace of acid, for example toluene-p-sulphonic acid or methanesulphonic acid.

The preparation of the compounds of Formulae III and IV from readily obtainable starting materials can be carried out by the processes represented in the following diagrams, in which R and R' are as hereinbefore defined, and R" represents an alkyl radical which may have from 1 to 4 carbon atoms. Preferably, the operations are carried out with compounds in which R' and R" are identical, and more especially with compounds in which R' and R" are both either methyl or ethyl.

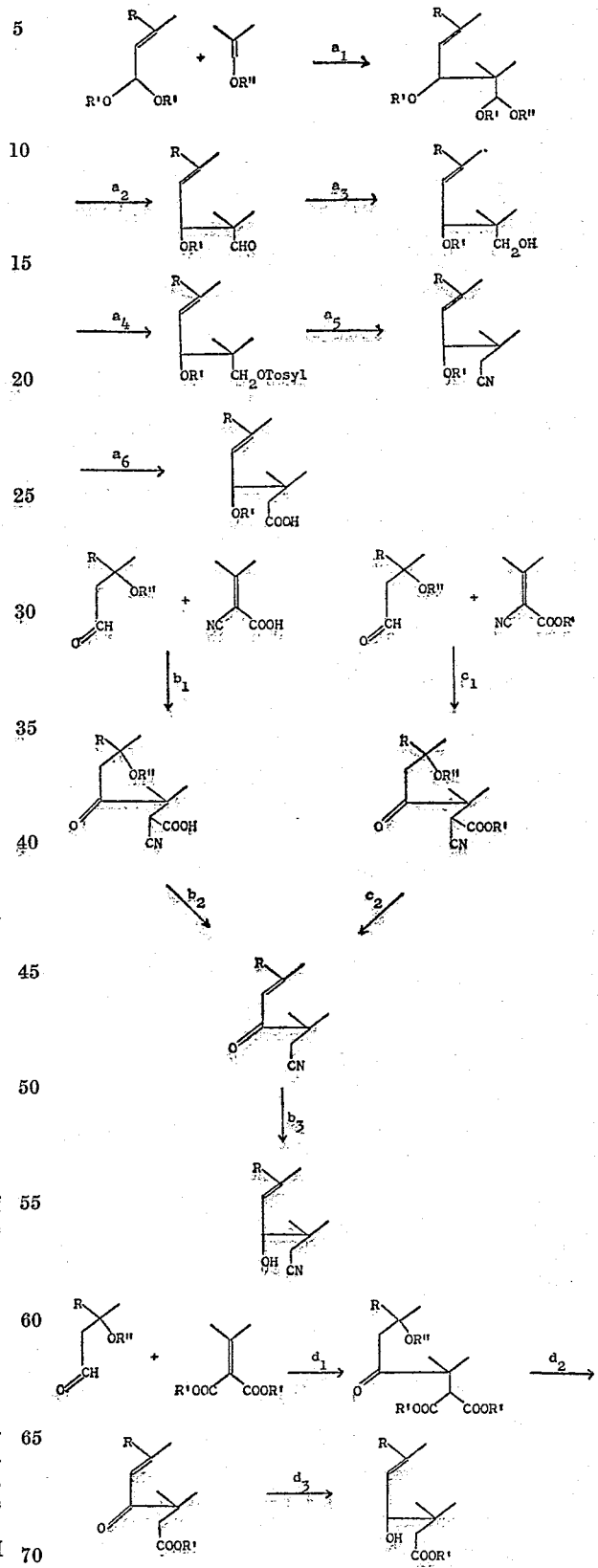

The reaction represented by $a_1$ in the diagram takes place in the presence of a catalyst such as boron trifluoride or a complex thereof such as the etherate. The deacetalization of phase $a_2$ takes place without difficulty by any usual method. The reduction of phase $a_3$ requires the use of a reagent which leaves intact the ethylenic 4,5-bond. Lithium aluminium hydride, potassium borohydride or the tributoxyhydride of lithium and aluminium may be employed. The nitrilation (phase $a_5$) can be carried out by the action of an alkali metal cyanide on an appropriate sulphonic ester, ordinarily a tosylate or mesylate, the operation being carried out in a strongly polar solvent such as, for example, dimethylsulphoxide, dimethylformamide or dimethylacetamide, at a temperature preferably between 50° and 100° C. The saponification (phase $a_6$) is effected by application of the usual saponification methods.

The reactions $b_1$, $c_1$ and $d_1$ take place in the presence of a peroxide. Phases $b_2$, $c_2$ and $d_2$ comprise a decarboxylation by heating, including a previous saponification in the case of the reactions $c_2$ and $d_2$ and the elimination of an alkoxy group R″O— as the alcohol R″OH. A more or less complete elimination of the alkoxy group is already obtained during the decarboxylation treatment. The removal of the group R″O— is then completed either directly on the crude decarboxylation mixture or after optional separation of the product which has retained the ether function. The decarboxylation treatment is preferably carried out in the presence of copper powder and quinoline. The further treatment for the removal of the group R″O— is preferably carried out by heating the mixture in the presence of a mixture of acetic acid and sodium acetate or in the presence of acetic acid to which has been added a little sulphuric or phosphoric acid, or in the presence of any other reagent capable of catalysing the removal of one molecule of the alcohol R″ OH without modifying the remainder of the molecule.

In the case of the reactions represented by $c_2$ and $d_2$, which include a previous saponification, this saponification must be carried out under conditions which are so gentle as only to saponify one of the two saponifiable groups, namely the ester group in the case of $c_2$ or one only of the two ester groups in the case of $d_2$. By operating at ambient temperature or at a temperature only slightly above ambient temperature, this saponification can readily be controlled.

The reduction of phase $b_3$ (or $d_3$) is effected with any reducing agent which leaves intact the double bond and the other functions of the molecule, for example an alkali metal borohydride.

The following examples illustrate the invention.

*Example 1*

To 20 cc. of benzene is added the crude ethyl 3,3,6-trimethyl-4-chloro-hept-5-enoate prepared from 5.5 g. of 3,3,6-trimethyl-4-ethoxy-hept-5-enoic acid in the manner described below, and 30 cc. of a 1.5 N solution of sodium t-amoxide in benzene are added. The solution is left overnight at room temperature and then refluxed for an hour and a half. There are then added 100 cc. of water and the organic solution is decanted and stirred for 20 minutes with 50 cc. of N sodium hydroxide solution. Finally, the organic phase is washed with water and dried over anhydrous sodium sulphate. Distillation gives 3 g. of ethyl chrysanthemate: B.P.$_{0.4\ mm.}$=72–74° C.; $n_D^{20}$=1.4590; yield=61%.

Saponification of 1.9 g. of this ester by heating in the presence of 1.5 g. of potassium hydroxide in solution in 50 cc. of methanol, followed by acidification with hydrochloric acid, gives 1.4 g., 85% yield, of chrysanthemic acid, melting at 47–48° C. after recrystallisation from ethyl acetate.

The ethyl 3,3,6-trimethyl-4-chloro-hept-5-enoate employed as starting material may be prepared as follows:

(1) Into a three-necked spherical flask provided with a stirrer, a condenser with an "Actigel" trap and a thermometer are introduced 171 g. of the diethylacetal of dimethylacrolein (1.08 mol.) and then 15 cc. of a 10% solution of zinc chloride in ethyl acetate containing 2% by volume of boron trifluoride etherate. 110 g. of isobutenyl ethyl ether are then added at a rate such that the temperature of the mixture remains at about 36–37° C. After cooling, dilution with 300 cc. of diethyl ether, washing with 100 cc. of 2 N sodium hydroxide and then with 200 cc. of water, drying, evaporation of the ether and distillation, there are obtained 165 g. of 1,1,3-triethoxy-2,2,5-trimethyl-hex-4-ene, B.P.$_{0.3\ mm.}$=80–81° C.; $n_D^{20}$=1.4360; yield=62%.

(2) 155 g. of 1,1,3-triethoxy-2,2,5-trimethyl-hex-4-ene are vigorously stirred with 300 cc. of aqueous 2% phosphoric acid solution at 85° C. for 70 minutes in the presence of hydroquinone. After neutralisation with sodium bicarbonate, the organic phase is decanted and the mother liquors are extracted with 2× 100 cc. of diethyl ether. The ethereal extracts are added to the organic phase, and the whole is then washed with water and dried over sodium sulphate. Distillation gives 85 g. of 2,2,5-trimethyl-3-ethoxy-hex-4-en-1-al, B.P.$_{20\ mm.}$=96–99° C.; $n_D^{20}$=1.4422; yield=77%

(3) To a suspension of 14 g. of lithium aluminium hydride in 500 cc. of anhydrous ether are added with stirring 85 g. (0.46 mol.) of 2,2,5-trimethyl-3-ethoxy-hex-4-en-1-al in 500 cc. of anhydrous diethyl ether. Stirring is continued overnight and the operation is terminated by heating the mixture under reflux for one hour. The excess of hydride is destroyed by the addition of ethyl acetate and the solution is hydrolysed with water. After decantation, drying over sodium sulphate and distillation, there are obtained 75 g. of 2,2,5-trimethyl-3-ethoxy-hex-4-en-1-ol.

(4) To a solution of 42.5 g. (0.23 mol.) of 2,2,5-trimethyl-3-ethoxy-hex-4-en-1-ol in 90 cc. of pyridine cooled to 0° C. are added 47.5 g. (0.25 mol.) of p-toluene sulphonyl chloride. The mixture is left to stand for 15 hours and is then poured into iced water and extracted with ether. The ethereal extract is washed successively with 4× 100 cc. of 2 N sulphuric acid, 100 cc. of 8% sodium bicarbonate solution, and finally with water, and dried over sodium sulphate. After elimination of the solvent, an oil is obtained which crystallizes. Recrystallization from petroleum ether (B.P.=35–55° C.) gives 60 g. of the toluene p-sulphonate of 2,2,5-trimethyl-3-ethoxy-hex-4-en-1-ol, in crystals melting at 46–47° C., yield=77%.

(5) 20 g. of the preceding toluene p-sulphonate, 20 g. of dry potassium cyanide and 120 cc. of distilled dimethylsulphoxide are mixed, and the mixture is heated for 112 hours at 90° C. under nitrogen, with stirring. The product is then diluted with 300 cc. of water, and extracted with 2× 100 cc. of diethyl ether. The extract is washed with water, dried over sodium sulphate and distilled. There are thus recovered 6.7 g. of 3,3,6-trimethyl-4-ethoxy-hept-5-ene-1-nitrile, B.P.$_{0.4\ mm.}$=73° C.; $n_D^{20}$=1.4452; yield=62%

(6) 6.2 g. of 3,3,6-trimethyl-4-ethoxy-hept-5-ene-1-nitrile are refluxed for 30 hours in 25 cc. of 2-ethoxy-ethanol with 6 g. of potassium hydroxide. After dilution with water and extraction with diethyl ether to eliminate the neutral fraction, the aqueous solution is acidified with hydrochloric acid, and the organic acid thus formed is then extracted with ether (2× 50 cc.), and the extract is washed with water and dried over sodium sulphate. Distillation gives 4 g. of 3,3,6-trimethyl-4-ethoxy-hept-5-enoic acid as a colourless oil, B.P.$_{0.5\ mm.}$=109–112° C.

(7) 5.5 g. (0.026 mol.) of the latter acid are added to 55 cc. of petroleum ether (B.P.=60–80° C.), and 3.15 g. (0.026 mol.) of distilled thionyl chloride are added and the mixture is heated under reflux for 1 hour. After cooling, the solution is washed with 2× 50 cc. of 0.1 N sodium hydroxide and then with water, and dried over sodium sulphate. After evaporation of the solvents, ethyl, 3,3,6-trimethyl-4-chloro-hept-5-enoate remains.

Example 2

A mixture of 810 mg. of 3,3,6-trimethyl-4-benzoyloxy-hept-5-ene-1-nitrile, 400 mg. of sodamide and 7 cc. of anhydrous dimethylformamide is heated under reflux overnight. After cooling, the product is poured onto ice and extracted with diethyl ether (50 cc.), and the organic solution is washed successively with an aqueous sodium bicarbonate solution and with water, and dried over sodium sulphate. By distillation, there are isolated 270 mg. of (dl)-trans-chrysanthemic nitrile in the form of a colourless liquid, yield=60%; B.P.$_{2mm.}$=100° C.; $n_D^{22}$=1.4695.

330 mg. of the preceding nitrile in 2 cc. of ethylene glycol are heated under reflux for 24 hours with 350 mg. of potassium hydroxide. After cooling, the product is poured into water and unsaponifiable material is extracted with ether (50 cc.). The aqueous solution is acidified with hydrochloric acid and extracted with ether (50 cc.) in 2 lots. The ethereal extracts are extracted with 20 cc. of aqueous 8% sodium bicarbonate solution, and the aqueous solution thus obtained is acidified with hydrochloric acid. The product is again extracted with ether (50 cc.) and there are isolated from this extract 240 mg. (68% yield) of liquid (dl)-trans-chrysanthemic acid, which crystallises on the addition of a seed crystal.

The benzoate ester employed as starting material may be prepared as follows:

(1) 213 g. of α-ethoxyisovaleraldehyde (1.65 mol.) and 60 g. (0.39 mol.) of ethylisopropylidene cyanacetate are heated under nitrogen at 85° C. for 60 hours (4 periods of 15 hours), 11 g. of benzoyl peroxide being added from time to time in small quantities (0.2 to 0.3 g.). The product is then distilled under nitrogen (pressure=13 mm. Hg) up to 60° C., and 124 g. of a mixture of aldehydes is obtained. The residue is extracted with 200 cc. of diethyl ether, and the ethereal solution is successively washed with 2× 100 cc. of 8% sodium bicarbonate solution, 50 cc. of aqueous sodium bisulphite solution, and water, and is then dried over sodium sulphate. The ether is evaporated and ethyl 2-cyano-3,3,6-trimethyl-4-oxo-6-ethoxyheptanoate is distilled. It is a yellow oil, B.P.$_{0.1\ mm.}$=115–120° C.

$n_D^{21}$=1.4530, yield=77 g. (70%).

(2) 7.7 g. of the ethoxyketonitrileester are treated at boiling point for 27 hours with 40 cc. of 75% aqueous acetic acid solution in the presence of 400 mg. of sodium acetate. After cooling and neutralization, the mixture is extracted with 100 cc. of ether and the ethereal solution is washed with sodium bicarbonate solution and then with water and dried over anhydrous sodium sulphate. On distillation, there are obtained 4.21 g. (65%) of ethyl 2-cyano-3,3,6-trimethyl-4-oxo-hept-5-enoate, B.P.$_{0.3\ mm.}$=110°–115° C.

$n_D^{24}$=1.4700.

(3) 36 g. of this ethylenic ketonitrile ester are dissolved in 100 cc. of ethyl alcohol. 11.2 g. of potassium hydroxide dissolved in 30 cc. of water are added, and the mixture is left for 40 hours at ambient temperature (about 20° C.). The alcohol is then driven off under reduced pressure, the residue is acidified with 2 N hydrochloric acid to a pH of 1, the orange-red layer which forms is separated, and the mother liquors are extracted with ether. The ethereal extract and orange-red layer are combined, dried over sodium sulphate and the solvent is evaporated. The residue is then heated at 120° C. under an absolute pressure of 20–25 mm. Hg for one hour to effect decarboxylation, and then distilled. There are obtained 14.5 g. (58%) of 3,3,6-trimethyl-4-oxo-hept-5-ene nitrile as a colourless liquid, B.P.$_{0.1\ mm.}$=75° C.; $n_D^{20.5°}$=1.4740.

(4) Instead of first forming the ethylenic bond in the 5-position and then saponifying and decarboxylating as described in the foregoing paragraphs (2) and (3), it is possible first to saponify ethyl 2-cyano-3,3,6-trimethyl-4-oxo-6-ethoxyheptanoate with aqueous alcoholic potassium hydroxide at ambient temperature, to isolate the organic acid formed and to decarboxylate this acid by heating at 145° C. under normal pressure in the presence of copper powder and quinoline, which gives a mixture of 3,3,6-trimethyl-4-oxo-hept-5-ene-1-nitrile and 3,3,6-trimethyl-4-oxo-6-ethoxyheptane-1-nitrile, the non-ethylenic fraction of which may be converted into the corresponding ethylenic oxonitrile by heating with a mixture of acetic acid and sodium acetate. This treatment may be carried out either on the mixture of the two nitriles or on the separated non-ethylenic nitrile alone.

(5) To 6.33 g. (0.038 mol.) of the ethylenic ketonitrile in 32 cc. of methanol are added at 0° C. 2 g. of potassium borohydride (0.041 mol.) in solution in a minimum of water. The mixture is stirred for 7½ hours at 0° C. After a little alcohol has been evaporated in vacuo, water (30 cc.) is added and the product is extracted with diethyl ether (2× 50 cc.), washed with 2 N sulphuric acid (20 cc.) and then with 20 cc. of 8% sodium bicarbonate solution, and dried over sodium sulphate. On distillation, there are obtained 4.85 g. (77% yield) of 3,3,6-trimethyl-4-hydroxy-hept-5-ene-1-nitrile, B.P.$_{0.05\ mm.}$=78–80° C.; $n_D^{20°}$=1.4670.

(6) 1 g. of this alcohol is dissolved in 8 cc. of anhydrous pyridine and 0.75 cc. of distilled benzoyl chloride is added. Since the benzoate does not form readily in the cold, the mixture is gently heated for 5 minutes and then poured into water, and extracted with diethyl ether (2× 25 cc.). The extract is washed with 2 N sulphuric acid and with dilute sodium hydroxide, and dried over sodium sulphate. On evaporation of the solvent, there is obtained 1.6 g. of a crude oil which, on chromatography on neutral alumina with petroleum ether (B.P.=35–50° C.) as eluant, gives 1.02 g. (60%) of the pure benzoate.

Example 3

1 g. of the 3,3,6-trimethyl-4-(p-nitrobenzoyloxy)-hept-5-ene-1-nitrile is dissolved in 10 cc. of anhydrous dimethylformamide, 420 mg. of sodium amide are added and the mixture is heated under reflux overnight. After cooling, the product is poured onto ice, and extracted with ether. The extract is washed with sodium bicarbonate solution and then with water and dried over anhydrous sodium sulphate. On distillation, there are isolated 190 mg. (40% yield) of chrysanthemic nitrile identical with that described in Example 2 and convertible, like the latter, into (dl)-trans-chrysanthemic acid, M.P. 45° C.

The p-nitrobenzoate employed as starting material is prepared from p-nitrobenzoyl chloride and 3,3,6-trimethyl-4-hydroxy-hept-5-ene-1-nitrile, using the method described in Example 2.

Example 4

By proceeding as in Example 2, but starting with 3,3,6-trimethyl-4-acetyloxy-hept-5-ene-1-nitrile, there are similarly obtained the chrysanthemic nitrile and acid.

The 3,3,6-trimethyl-4-acetyloxy-hept-5-ene-1-nitrile (0.5 g.) was also cyclised by treatment with 2 cc. of 1.7 N sodium t-amyoxide in 15 cc. of dimethylformamide. After standing overnight at ambient temperature (about 20° C.) the product was boiled for 2 hours and there was isolated from the mixture obtained, by the method described in Example 2, the chrysanthemic nitrile, which was then converted into the acid.

The acetate starting material may be prepared by the action of acetric anhydride on 3,3,6-trimethyl-4-hydroxy-hept-5-ene-1-nitrile, the operation being carried out as in the case of the benzoic ester in Example 2.

Example 5

The ethyl 3,3-dimethyl-4-chloro-hept-5-enoate derived from 11 g. of 3,3-dimethyl-4-ethoxy-hept-5-enoic acid as described below is dissolved in 25 cc. of benzene, and 55 cc. of a 1.5 N benzene solution of sodium t-amoxide are then added. The mixture is left for 15 hours at ambient temperature (about 20° C.) and then refluxed for 1½ hours. The reaction product is worked up as in Example 1, and there are thus obtained 6.3 g. of ethyl 2,2-dimethyl-3 - (1 - propenyl)cyclopropanecarboxylate, yield=63%; B.P.$_{0.4\text{ mm.}}$=63–65° C.

By saponifying 5.5 g. (0.03 mol.) of this ester by heating under reflux for 4 hours with 5 g. of potassium hydroxide in 30 cc. of ethanol and then extracting as in Example 1, there are obtained 2.675 g. of 2,2-dimethyl-3-(1-propenyl)cyclopropanecarboxylic acid, M.P. 58–60° C.

The ethyl 3,3-dimethyl-4-chloro-hept-5-enoate employed as starting material may be prepared as follows.

(1) Into a three-necked spherical flask provided with a stirrer, a condenser having an "Actigel" trap, and a thermometer are introduced 160 g. (1.1 mol.) of the diethyl acetal of crotonaldehyde with 25 ml. of a 10% zinc chloride solution in ethyl acetate containing 2% by volume of boron trifluoride etherate. With stirring, 110 g. (1.1 mol.) of isobutyrylethyl ether are added at such a rate that the temperature does not rise above 40° C. When the addition is complete, the stirring is continued for one hour at room temperature and then for one hour at 30–35° C.

The mixture is diluted with diethyl ether, washed with 2 N sodium hydroxide and then with water, and dried over sodium sulphate. After evaporation of the ether, distillation gives 145 g. of product (54% yield), B.P.$_{25\text{ mm.}}$=121° C.; $n_D^{21.5}$=1.4317; identified as 1,1,3-triethoxy-2,2-dimethyl-hex-4-ene.

(2) 150 g. of 1,1,3-triethoxy-2,2-dimethyl-hex-4-ene (0.61 mol.) and 250 cc. of 5% phosphoric acid are heated with vigorous stirring in the presence of hydroquinone at 85° C. for 1 hour 30 minutes. After cooling, the mixture is neutralised with sodium bicarbonate and extracted with ether. After drying over sodium sulphate and elimination of the solvents, distillation gives 100 g. (0.59 mol.), B.P.$_{25\text{ mm.}}$=95–97° C.; $n_D^{20}$=1.4372; of 2,2-dimethyl-3-ethoxy-hex-4-ene-1-al (96% yield).

(3) To a suspension of lithium aluminium hydride (13 g.) in 250 cc. of anhydrous diethyl ether are added 80 g. of the preceding aldehyde (0.46 mol.) in solution in 250 cc. of anhydrous ether. This addition is carried out drop by drop so as to maintain a light reflux. When the addition is complete, the product is refluxed for one hour. After cooling, the excess of hydride is destroyed by the addition of water, the ethereal phase is decanted and the product is dried over sodium sulphate. After evaporation of the ether and distillation, there are obtained 65 g. of 2,2 - dimethyl - 3-ethoxy-hex-4-ene-1-ol, B.P.$_{20\text{ mm.}}$=100–103° C.; $n_D^{20}$=1.4428; yield=81%.

(4) 50 g. of this alcohol (0.29 mol.) are dissolved at 0° C. in 120 cc. of pyridine and 60 g. of tosyl chloride are added in small quantities with stirring. The stirring is continued for 4 hours after the end of the addition, and the mixture is then left overnight in the refrigerator.

The mixture is poured into iced water (500 cc.) and extracted twice with ether (2× 200 cc.). The ethereal extract is washed with 2 N sulphuric acid, 2 N sodium hydroxide and water, and dried over sodium sulphate. After evaporation of the ether, an oil is recovered, which crystallises. Recrystallisation from petroleum ether (B.P.=33–55° C.) gives 75 g. of the toluene p-sulphonate of 2,2-dimethyl-3-ethoxy-hex-3-ene-1-ol, M.P. 44–46° C. (79% yield).

(5) 25 g. of this tosylate and 40 g. of recrystallised potassium cyanide are added to 250 cc. of distilled dimethylsulphoxide, and the mixture is then heated with stirring at 85–90° C. for 90 hours under a current of nitrogen. After dilution with water (500 cc.) and extraction with diethyl ether (2× 200 cc.), the extracts are washed with water saturated with sodium chloride and then dried over anhydrous sodium sulphate. After elimination of the ether, the product is distilled and there are obtained 9.2 g. (67% yield) of 3,3-dimethyl-4-ethoxy-hept-5-ene-1-nitrile, B.P.$_{0.4\text{ mm.}}$=63–66° C.; $n_D^{20}$=1.4402.

(6) 14 g. of this nitrile are refluxed for 40 hours in 60 cc. of 2-ethoxyethanol with 10 g. of potassium hydroxide After dilution with water (100 cc.), the product is extracted with ether (2× 50 cc.). The aqueous solution is then acidified by the addition of hydrochloric acid and extracted with ether (2× 50 cc.). The latter ethereal extract is taken up in sodium hydroxide solution (2× 100 cc.) and the aqueous solution obtained is acidified, extracted with ether (2× 50 cc.) and dried over anhydrous sodium sulphate. Distillation gives 10 g. of 3,3-dimethyl-4 - ethoxy - hept - 5 - enoic acid, B.P.$_{0.5\text{ mm.}}$=112° C.; $n_D^{21}$=1.4492; yield=65%.

(7) 11 g. of this ethoxy acid (0.055 mol.), 6.7 g. of thionyl chloride and 100 cc. of petroleum ether (B.P.=60–80° C.) are refluxed for 6 hours. After evaporation of the solvent, the product is poured into water and extracted with ether (2× 50 cc.) and the extract washed with dilute sodium hydroxide solution, and dried over sodium sulphate. After evaporation of the ether, there remains ethyl 3,3-dimethyl-4-chloro-hept-5-enoate.

*Example 6*

15.2 g. (0.059 mol.) of 3,3-dimethyl-4-benzoyloxy-hept-5-ene-1-nitrile in 130 cc. of dimethylformamide are treated with 6.2 g. of amide (0.18 mol.), first for one hour at a temperature of about 20° C. and then overnight at 150° C. 500 cc. of water are then added, the product is extracted three times with 150 cc. of diethyl ether each time, and the ethereal solution is washed with aqueous sodium bicarbonate solution and then twice with water, and finally dried over sodium sulphate. On distillation, 3.8 g. (40% yield) of 1-cyano-2,2-dimethyl-3-(1-propenyl)cyclopropane are recovered at a temperature of about 65° C. at 0.7 mm. Hg.

By saponifying 540 mg. of this nitrile by heating at boiling point overnight with 500 mg. of potassium hydroxide and 10 cc. of ethylene glycol, and acidifying with hydrochloric acid, followed by extraction, there are obtained 425 mg. (70% yield) of 2,2-dimethyl-3-(1-propenyl)-cyclopropanecarboxylic acid, M.P. 55–57° C.

The initial benzoic ester may be prepared in the following manner.

(1) 406 g. of α-ethoxybutyraldehyde and 140 g. of ethylisopropylidene cyanacetate are heated at 80° C. for 58 hours (4 periods of 14½ hours) under nitrogen. Each heating period is preceded by the addition of 9 g. of benzoyl peroxide. At the end of the reaction the excess of aldehyde (260 g.) is distilled off, and the residue is extracted with ether (200+200+100 cc.). The extract is washed successively with aqueous solutions of sodium bicarbonate and sodium bisulphite, and then with water, and dried over anhydrous sodium sulphate. The ether is driven off and there are recovered by distillation, first 74 g. of ethylisopropylidene cyanacetate, and then 72.2 g. of ethyl, 3,3 - dimethyl-6-ethoxy-4-oxo-2-cyano-heptanoate, $n_D^{24}$=1.4520; B.P. $_{0.03\text{ mm.}}$=100–105° C.; yield=61%.

(2) 57.5 g. of this ethoxycyano ester are treated for 3 hours with 220 cc. of a solution of N potassium hydroxide in aqueous ethanol (0.22 mol.) at refrigerator temperature. After acidification with hydrochloric acid, extraction with ether and the usual washings of the extract, there are obtained 38.8 g. of an acid fraction and 15.5 g. of an ester fraction. The treatment of the ester fraction with an equivalent of an aqueous alcoholic solution of N potassium hydroxide for 1 hour at room temperature gives 8.5 g. of an acid fraction, and there remain 4.2 g. of ester fraction. There are are thus obtained in all 47.3 g. of an acid fraction, which is decarboxylated by heating at 145° C. for one hour under normal pressure in quinoline in the presence of copper. By distillation, there are then isolated 24.51 g. of a mixture which is shown by infra-red analysis to consist of two-thirds of products having an ethylenic bond and one-third of products still containing an ethoxy group. There are then added to this mixture 150 cc. of 75% acetic acid and 2 g. of potassium acetate, and the mixture is refluxed for 21 hours. After neutralisation and distillation, there are obtained 13.53 g. of product, B.P.$_{0.5\,mm}$=80° C., identified as 3,3-dimethyl-4-oxo-hept-5-ene-1-nitrile.

(3) To 9.12 g. of this ketonitrile (0.0586 mol.) dissolved in 50 cc. of methanol are added drop by drop at 0° C. 3.1 g. (0.058 mol.) of potassium borohydride in solution in 20 cc. of water. The mixture is stirred for 6½ hours. When a little of the alcohol has been evaporated in vacuo, 40 cc. of water are added, and the product is extracted twice with ether, and the extract is washed with 2 N sulphuric acid, with sodium bicarbonate solution and with water, and dried over sodium sulphate. By distillation, there are recovered 6.48 g. of 3,3-dimethyl-4-hydroxy-hept-5 - ene - 1 - nitrile, B.P.$_{1.5mm}$=106–107° C. (70% yield).

(4) 3.15 g. of this alcohol are dissolved in 25 cc. of pyridine, and 3 cc. of benzoyl chloride are added. By proceeding as in Example 2 (6), there are obtained 5.57 g. of crude 3,3-dimethyl-4-benzoyloxy-hept - 5 - ene - 1-nitrile.

I claim:
1. A compound of the formula:

in which R is hydrogen or methyl, X represents chlorine or bromine or a p-toluenesulphonyloxy, methanesulphonyloxy, acetoxy, benzoyloxy, or p-nitrobenzoyloxy group, and Y is —CN or —COOR', where R' is lower alkyl.

2. A compound of the formula:

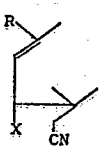

in which R is hydrogen or methyl, and X is an aliphatic or aromatic carboxylic ester residue.

3. A compound as claimed in claim 2 in which X is acetoxy, benzoyloxy, or para-nitrobenzoyloxy.

4. A compound of the formula:

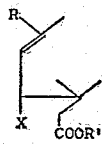

in which R is hydrogen or methyl, X is chlorine or bromine, and R' is lower alkyl.

5. Ethyl 3,3,6-trimethyl-4-chloro-hept-5-enoate.
6. 3,3,6-trimethyl-4-benzoyloxy-hept-5-ene-1-nitrile.
7. 3,3,6-trimethyl-4-(p-nitrobenzoyloxy)-hept - 5 - ene-1-nitrile.
8. 3,3,6-trimethyl-4-acetyloxy-hept-5-ene-1-nitrile.
9. Ethyl 3,3-dimethyl-4-chloro-hept-5-enoate.
10. 3,3-dimethyl-4-benzoyloxy-hept-5-ene-1-nitrile.

References Cited
UNITED STATES PATENTS 3,077,496  2/1963  Julia _____ 260—486 X
3,123,629  3/1964  Julia _____ 260—468 X CHARLES B. PARKER, *Primary Examiner.*

JOSEPH P. BRUST, *Examiner.*

D. H. TORRENCE, *Assistant Examiner.*